US006631962B2

(12) United States Patent
Rehmann et al.

(10) Patent No.: US 6,631,962 B2
(45) Date of Patent: Oct. 14, 2003

(54) SYSTEM FOR INK SHORT PROTECTION

(75) Inventors: David A Rehmann, Vancouver, WA (US); Steven B Elgee, Portland, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/231,797

(22) Filed: Aug. 29, 2002

(65) Prior Publication Data

US 2003/0020771 A1 Jan. 30, 2003

Related U.S. Application Data

(63) Continuation of application No. 09/912,981, filed on Jul. 25, 2001.

(51) Int. Cl.[7] ............................... B41J 2/07; H04B 1/52

(52) U.S. Cl. ................................ 347/5; 333/4; 370/284

(58) Field of Search ....................... 349/5, 9, 57; 333/4, 333/12; 370/284, 278; 327/362; 375/257

(56) References Cited

U.S. PATENT DOCUMENTS 5,801,721 A * 9/1998 Gandy et al. .................. 347/5
6,039,428 A 3/2000 Juve ............................ 347/19
6,351,530 B1 * 2/2002 Rahamim et al. ........... 375/257

FOREIGN PATENT DOCUMENTS

EP 0750242 12/1996
EP 0805028 11/1997
EP 1032132 8/2000
EP 1057640 12/2000

OTHER PUBLICATIONS

Huq, Syed, An Overview of LVDS Technology. National Semiconductor Application Note 971 [Online], Jul. 1998 [retrieved on Feb. 4, 2002]. Retrieved from the internet:<URL: http://www.national.com/an/AN/AN–971.pdf>.*

International Engineering Consortium, Low–Voltage Differential Signaling (LVDS), Ch. 9, DC Balance for Longer Cables [Online], retrieved on Jun. 8, 2003. Retrieved from the Internet:<URL: http://www.iec.org/online/tutorials/low__voltage/topic09.html>.*

British Search Report dated Sep. 6, 2002.

European Search Report dated Oct. 21, 2002.

* cited by examiner

*Primary Examiner*—Stephen D. Meier
*Assistant Examiner*—Julian D. Huffman
(74) *Attorney, Agent, or Firm*—Christopher B. Miller

(57) ABSTRACT

A system for ink short protection for signaling to inkjet printheads includes a differential signaling driver having a first and a second terminal, a differential signaling receiver having a first and a second terminal, a first capacitor in series between the first terminals, a second capacitor in series between the second terminals, and circuitry for reducing charge accumulation on the capacitors. A method for ink short protection and a printing mechanism having such an ink short protection system are also provided.

38 Claims, 5 Drawing Sheets

SYSTEM FOR INK SHORT PROTECTION

CROSS REFERENCE TO RELATED APPLICATION(S)

This is a continuation of copending application Ser. No. 09/912,981 filed on Jul. 25, 2001 which is hereby incorporated by reference herein.

INTRODUCTION

The present invention relates generally to printing mechanisms, such as inkjet printers or inkjet plotters. Printing mechanisms often include an inkjet printhead which is capable of forming an image on many different types of media. The inkjet printhead ejects droplets of colored ink through a plurality of orifices and onto a given media as the media is advanced through a printzone. The printzone is defined by the plane created by the printhead orifices and any scanning or reciprocating movement the printhead may have back-and-forth and perpendicular to the movement of the media. Methods for expelling ink from the printhead orifices, or nozzles, include piezo-electric and thermal techniques which are well-known to those skilled in the art. For instance, two earlier thermal ink ejection mechanisms are shown in U.S. Pat. Nos. 5,278,584 and 4,683,481, both assigned to the present assignee, the Hewlett-Packard Company.

In a thermal inkjet system, a barrier layer containing ink channels and vaporization chambers is located between a nozzle orifice plate and a substrate layer. This substrate layer typically contains columnar arrays of heater elements, such as resistors, which are individually addressable and energized to heat ink within the vaporization chambers. Upon heating, an ink droplet is ejected from a nozzle associated with the energized resistor. The inkjet printhead nozzles are typically aligned in one or more columnar arrays substantially parallel to the motion of the print media as the media travels through the printzone.

Typically, the print media is advanced under the inkjet printhead and held stationary while the printhead passes along the width of the media, firing its nozzles as determined by a controller to form a desired image on an individual swath, or pass. The print media is usually advanced between passes of the reciprocating inkjet printhead in order to avoid uncertainty in the placement of the fired ink droplets.

A printing mechanism may have one or more inkjet printheads, corresponding to one or more colors, or "process colors" as they are referred to in the art. For example, a typical inkjet printing system may have a single printhead with only black ink; or the system may have four printheads, one each with black, cyan, magenta, and yellow inks; or the system may have three printheads, one each with cyan, magenta, and yellow inks. Of course, there are many more combinations and quantities of possible printheads in inkjet printing systems, including seven and eight ink/printhead systems.

Advanced printhead designs now permit an increased number of nozzles to be implemented on a single printhead. Thus, whether a single reciprocating printhead, multiple reciprocating printheads, or a page-wide printhead array are present in a given printing mechanism, the number of ink droplets which can be ejected per second is increased. While this increase in firing rate and density allows faster printing speeds, or throughput, there is also a corresponding increase in the amount of firing data which may be communicated from the printing mechanism controller to the printhead or printheads. In order to accommodate the faster data rates while reducing the conducted or radiated electromagnetic interference (EMI), constant current differential signaling techniques, such as low-voltage differential signaling (LVDS), have been implemented to transfer data from a controller to a printhead in printing mechanisms. An example of such an LVDS system is disclosed in commonly-owned, co-pending U.S. application Ser. No. 09/779,281.

Printing mechanisms may include LVDS drivers which receive firing signals from the controller and process the firing signals into a corresponding set of LVDS signals. The LVDS driver contains a constant current source which limits the output current to approximately three milliamps, while a switch steers the current between two transmission lines terminated by a resistor. This differential driver produces odd-mode transmission, where equal and opposite currents flow in the transmission lines. An LVDS driver produces no spike currents, and data rates as high as 1.5 gigabits per second are possible. Additionally, the constant current LVDS driver can tolerate the transmission lines being shorted together or to ground without creating thermal problems. This is advantageous, since ink shorting from the highly conductive ink residue and aerosol is a concern in inkjet printing mechanisms. Ink residue may build up on the printhead nozzle surface and migrate onto the printhead connector pads through normal printer operation or removal and installation of the printheads themselves. Similarly, air-borne aerosol may deposit onto the printhead contacts, creating a potential shorting situation for the LVDS transmission lines.

Unfortunately, despite the LVDS driver's tolerance for transmission lines shorted to each other, the LVDS driver and associated controller electronics, as well as the replaceable printhead may easily be damaged by an ink short to a DC power line. Relatively high DC voltages are received by the printhead to heat the resistors in the vaporization chambers of the printhead and thereby cause ink to be ejected from printhead nozzles. The ink residue and aerosol which are capable of shorting LVDS transmission lines together are also capable of shorting the LVDS transmission lines to the DC voltage, thereby resulting in a catastrophic failure of the printing mechanism components.

Prior printing mechanisms have used diodes to disallow the transmission lines from exceeding a maximum voltage in the event that an ink short occurred. This solution, however, is no longer viable with high-speed signaling as a result of the excessive capacitance a power diode presents to a weakly driven LVDS signal. Thus, shunt and zener diodes are not desirable for use as short protection with an LVDS system. Therefore, it would be desirable to have a robust and inexpensive system for protecting constant current differential signaling printer drivers, such as LVDS drivers, and printer electronics from the devastating effects of power supply currents in the event of ink shorts.

DETAILED DESCRIPTION OF THE PREFERRED EMBODIMENTS

Figure 1:
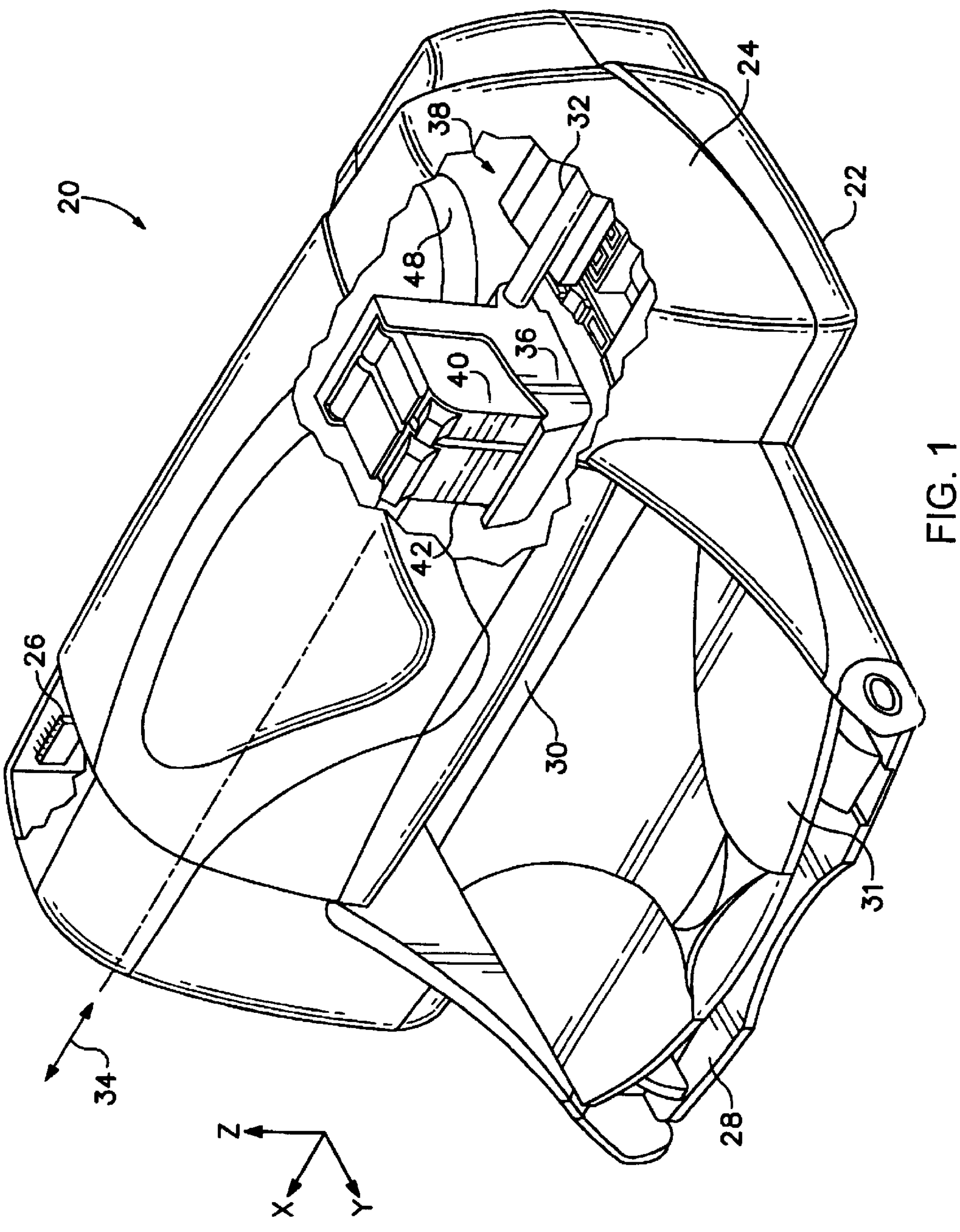
FIG. 1 is a fragmented perspective view of one form of an inkjet printing mechanism, here including two printheads connected to a controller by a flexible cable as part of a low-voltage differential signaling (LVDS) system.

FIG. 1 illustrates an embodiment of a printing mechanism, here shown as an inkjet printer 20, which may be constructed to implement the present invention. Inkjet printer 20 may be used for printing on a variety of media, such as paper, transparencies, coated media, cardstock, photo quality papers, and envelopes in an industrial, office, home or other environment. A variety of inkjet printing mechanisms are commercially available. For instance, some of the printing mechanisms that may embody the concepts described herein include desk top printers, portable printing units, wide-format printers, hybrid electrophotographic-inkjet printers, copiers, cameras, video printers, and facsimile machines, to name a few. For convenience the concepts introduced herein are described in the environment of an inkjet printer 20.

While it is apparent that the printer components may vary from model to model, the typical inkjet printer 20 includes a chassis 22 surrounded by a frame or casing enclosure 24, typically of a plastic material. The printer 20 also has a printer controller, illustrated schematically as a microprocessor 26, that receives instructions from a host device, such as a computer or personal data assistant (PDA) (not shown). A screen coupled to the host device may also be used to display visual information to an operator, such as the printer status or a particular program being run on the host device. Printer host devices, such as computers and PDA's, their input devices, such as a keyboards, mouse devices, stylus devices, and output devices such as liquid crystal display screens and monitors are all well known to those skilled in the art.

A print media handling system (not shown) may be used to advance a sheet of print media (not shown) from the media input tray 28 through a printzone 30 and to an output tray 31. A carriage guide rod 32 is mounted to the chassis 22 to define a scanning axis 34, with the guide rod 32 slideably supporting an inkjet carriage 36 for travel back and forth, reciprocally, across the printzone 30. A carriage drive motor (not shown) may be used to propel the carriage 36 in response to a control signal received from the controller 26. To provide carriage 36 positional feedback information to controller 26, an encoder strip (not shown) may be extended along the length of the printzone 30 and over a servicing region 38. An optical encoder reader may be mounted on the back surface of printhead carriage 36 to read positional information provided by the encoder strip, for example, as described in U.S. Pat. No. 5,276,970, also assigned to the Hewlett-Packard Company, the present assignee. The manner of providing positional feedback information via the encoder strip reader, may also be accomplished in a variety of ways known to those skilled in the art.

In the printzone 30, the media sheet receives ink from an inkjet cartridge, such as a black ink cartridge 40 and a color inkjet cartridge 42. The cartridges 40 and 42 are often called "pens" by those in the art. The black ink pen 40 is illustrated herein as containing a pigment-based ink. For the purposes of illustration, color pen 42 is described as containing three separate dye-based inks which are colored cyan, magenta, and yellow, although it is apparent that the color pen 42 may also contain pigment-based inks in some implementations. It is apparent that other types of inks may also be used in the pens 40 and 42, such as paraffin-based inks, as well as hybrid or composite inks having both dye and pigment characteristics. The illustrated printer 20 uses replaceable printhead cartridges where each pen has a reservoir that carries the entire ink supply as the printhead reciprocates over the printzone 30. As used herein, the term "pen" or "cartridge" may also refer to an "off-axis" ink delivery system, having main stationary reservoirs (not shown) for each ink (black, cyan, magenta, yellow, or other colors depending on the number of inks in the system) located in an ink supply region. In an off-axis system, the pens may be replenished by ink conveyed through a flexible tubing system from the stationary main reservoirs which are located "off-axis" from the path of printhead travel, so only a small ink supply is propelled by carriage 36 across the printzone 30. Other ink livery or fluid delivery systems, such as replaceable ink supply cartridges which attach onto print cartridges having permanent or semi-permanent print heads, may also employ the ink short protection systems described herein.

The illustrated black pen 40 has a printhead 44, and color pen 42 has a tri-color printhead 46 which ejects cyan, magenta, and yellow inks. The printheads 44, 46 selectively eject ink to form an image on a sheet of media when in the printzone 30. The printheads 44, 46 each have a plurality of ink drop generators formed therein in a manner well known to those skilled in the art. The ink drop generators of each printhead 44, 46 are typically formed in at least one, but typically a plurality of columnar arrays along an orifice plate. The term "columnar" as used herein may include nozzle arrangements slightly offset from one another, for example, in a zigzag or staggered arrangement. Each columnar array is typically aligned in a longitudinal direction perpendicular to the scanning axis 34, with the length of each array determining the maximum image swath for a single pass of the printhead. The ink drop generators are selectively energized in response to firing command control signals delivered from the controller 26 to the printhead carriage 36 via flexible printhead cable 48.

Figure 2:
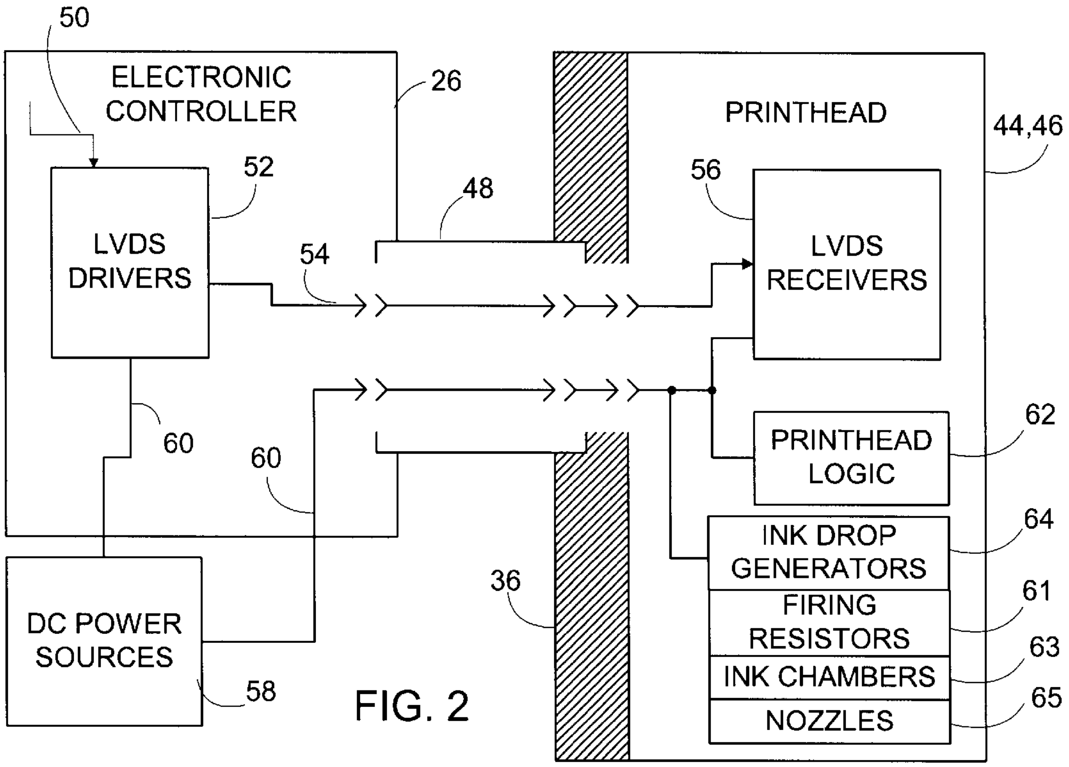
FIG. 2 is a block diagram illustrating one embodiment of an inkjet printing system which employs LVDS to communicate data from an electronic controller to a printhead.

The block diagram of FIG. 2 illustrates one embodiment of printer 20 which employs low-voltage differential signaling (LVDS) to communicate data to printheads 44, 46. Controller 26 generates or receives firing instructions 50 which are passed to the controller LVDS drivers 52. The controller LVDS drivers 52 generate output LVDS signals 54 which are transferred across cable 48 to the printhead carriage 36 and then to printhead LVDS receivers 56 on board printheads 44, 46. DC power sources 58 provide DC voltages 60 not only to the LVDS drivers 52 and controller 26, but also to the printheads 44, 46 in order to power the printhead LVDS receivers 56, the printhead logic 62, and the printhead ink drop generators 64. Different voltage levels may be utilized for each component of the printheads 44, 46, for example printhead LVDS receivers 56 may require 3.3 volts DC, printhead logic 62 may require 5.0 volts DC, and ink drop generators 64 may require 30 volts DC. All of these DC voltages 60 are typically passed through flexible cable 48, along with the output LVDS signals 54, to the printheads 44, 46. For illustrative purposes, ink drop generators 64 are shown in FIG. 2 employing thermal inkjet technology, although other types of drop generation technology, such as piezoelectric inkjet may be used as well. The ink drop generators have firing resistors 61, ink chambers 63, and nozzles 65. Upon energizing a selected resistor 61, a bubble of gas is formed in an associated ink chamber 63, and the formed gas ejects a droplet of ink from an associated nozzle 65 and onto the print media when in the printzone 30 under the nozzle 65.

Figure 3:
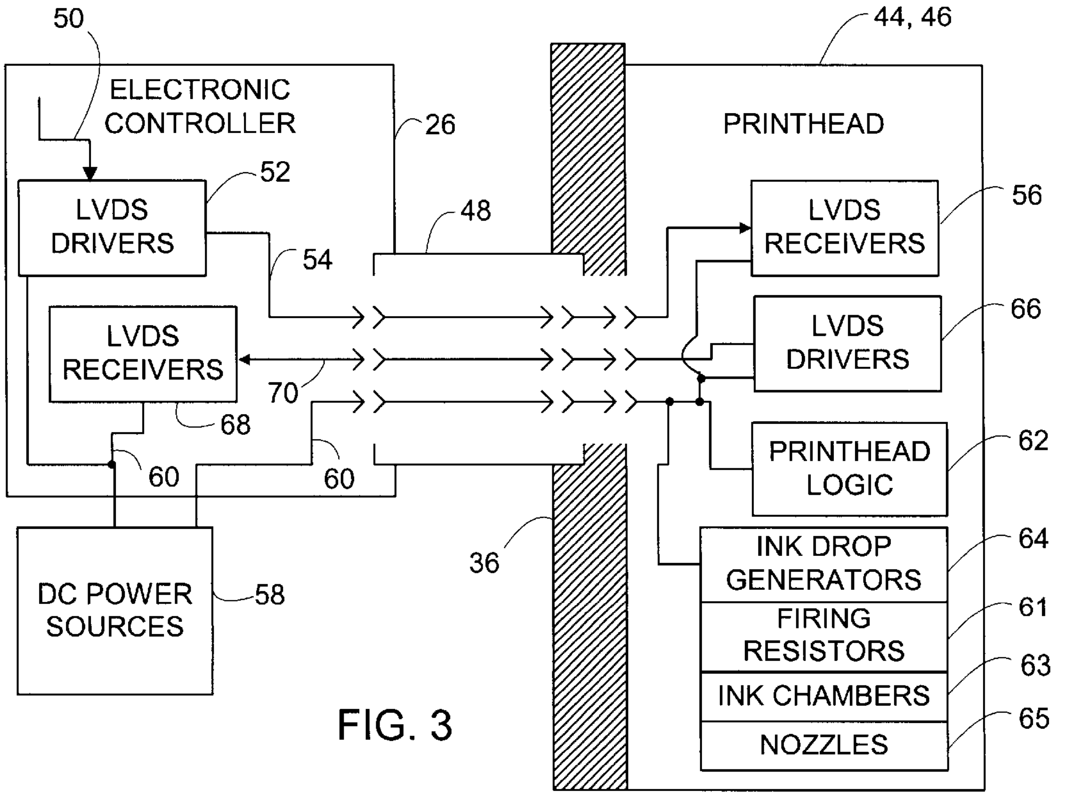
FIG. 3 is a block diagram illustrating one embodiment of an inkjet printing system which employs LVDS to communicate data between an electronic controller and a printhead.

The block diagram of FIG. 3 illustrates one embodiment of printer 20 which employs low-voltage differential signaling (LVDS) to communicate data back and forth between printheads 44, 46 and controller 26. While the data flow shown in the embodiment of FIG. 2 is unidirectional to the printhead, the embodiment shown in FIG. 3 is bi-directional by virtue of a printhead LVDS driver 66 and a controller LVDS receiver 68. The printhead LVDS driver 66 sends feedback LVDS signals 70 to the controller 26 via the LVDS receiver 68. These feedback signals 70 can include such information as pen identification or firing temperature.

Figure 4:
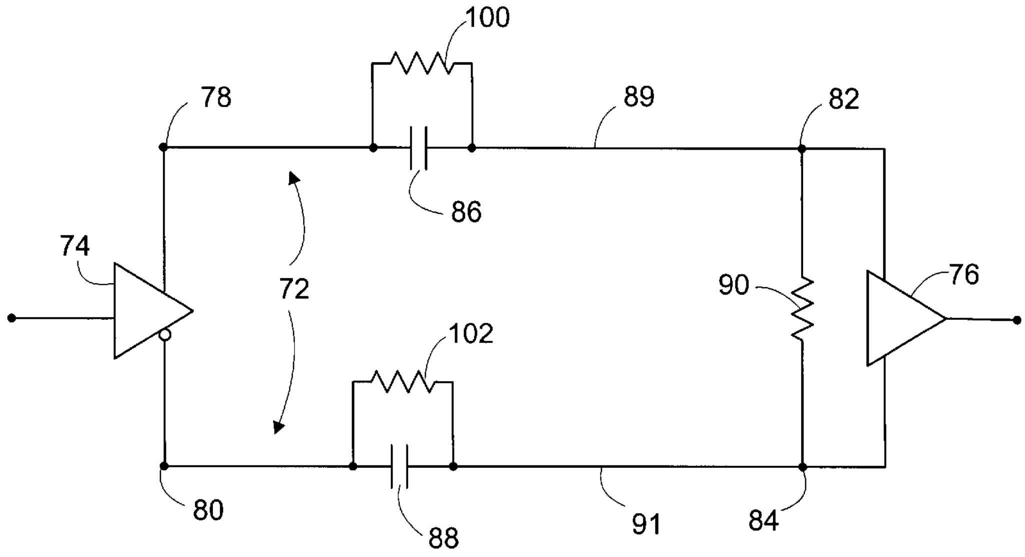
FIG. 4 is a functional schematic illustrating one embodiment of a passive circuit which is part of one example of an ink short protection system.

In either the unidirectional embodiment of FIG. 2 or the bi-directional embodiment of FIG. 3, it is desirable to prevent catastrophic printer failure in the event that the DC voltages 60 are shorted to either of the output LVDS signals 54 or the feedback LVDS signals 70. For each of the output LVDS signals 54 and each of the feedback LVDS signals 70, there is provided a pair of transmission lines 72. FIG. 4 illustrates an embodiment of an ink-short protection system as applied to a pair of LVDS transmission lines 72. An LVDS driver 74 is on one side of the transmission line pair 72, and an LVDS receiver 76 is on the other side. For simplicity, only one transmission line pair 72 is illustrated, although it should be understood that any of the illustrated embodiments for ink-short protection disclosed herein may be applied to any number of LVDS transmission line pairs 72.

LVDS Driver 74 has a non-inverted terminal 78 and an inverted terminal 80. LVDS receiver 76 has a non-inverted terminal 82 and an inverted terminal 84. A DC blocking capacitor 86 is connected in series between the non-inverted driver terminal 78 and the non-inverted receiver terminal 82. A second DC blocking capacitor 88 is connected in series between the inverted driver terminal 80 and the inverted receiver terminal 84. The DC blocking capacitors 86, 88 may be placed, for example, on the controller 26 side of cable 48 to prevent an ink short occurring near the printheads 4, 46 from destroying the printer controller 26. While the printheads 44, 46 would fail as a result of such a short, they are typically inexpensive with respect to the printer controller 26 and can be more easily replaced. In other applications, it may be desirable to position the blocking capacitors 86, 88 nearer to the printheads 44, 46 to protect the printheads 44, 46.

The LVDS differential pair created by the non-inverted and inverted terminals 82, 84 on the LVDS receiver 76 are typically terminated with a termination resistor 90 connected in parallel between the non-inverted receiver terminal 82 and the inverted receiver terminal 84 at the LVDS receiver 76 end of the transmission pair 72. The termination resistor 90 helps to prevent reflections on the non-inverted signal line 89 and the inverted signal line 91. The termination resistor 90 also converts the current from the LVDS driver 74 into a voltage for LVDS receiver 76.

The LVDS driver 74 contains a constant current source (not shown) which limits the output current to approximately three milliamps, while a switch (also not shown) steers the current between the transmission pair 72 as terminated by resistor 90. Thus, when the blocking capacitors 86, 88 are not present, the LVDS driver 74 produces odd-mode transmission, where equal and opposite currents flow in the transmission pair 72. Placing the DC blocking capacitors 86, 88 in series may result in a build-up of charge across each of the capacitors 86, 88 as the LVDS current is steered back and forth between the non-inverted line 89 and the inverted line 91. However, the presence of the DC blocking capacitors 86, 88 creates the need to compensate for the capacitor's inability to pass a signal that does not have an equal number of logic zeros and logic ones.

For example, an LVDS driver 74 would typically be set up to steer current to the non-inverted driver terminal 78 when transmitting a logic one, and then steer the current to the inverted driver terminal 80 when transmitting a logic zero. If the total number of ones exceeds the number of zeros, charge may build up on the DC blocking capacitors 86, 88. Similarly, if the total number of zeros is greater than the total number of ones, then charge may again build up on the DC blocking capacitors 86, 88, but in an opposite polarity. If charge continues to build up on the capacitors 86, 88, the ability of the LVDS driver 74 to deliver constant current may be sacrificed, preventing a signal from being generated across the termination resistor 90 at the LVDS receiver 76.

Figure 5:
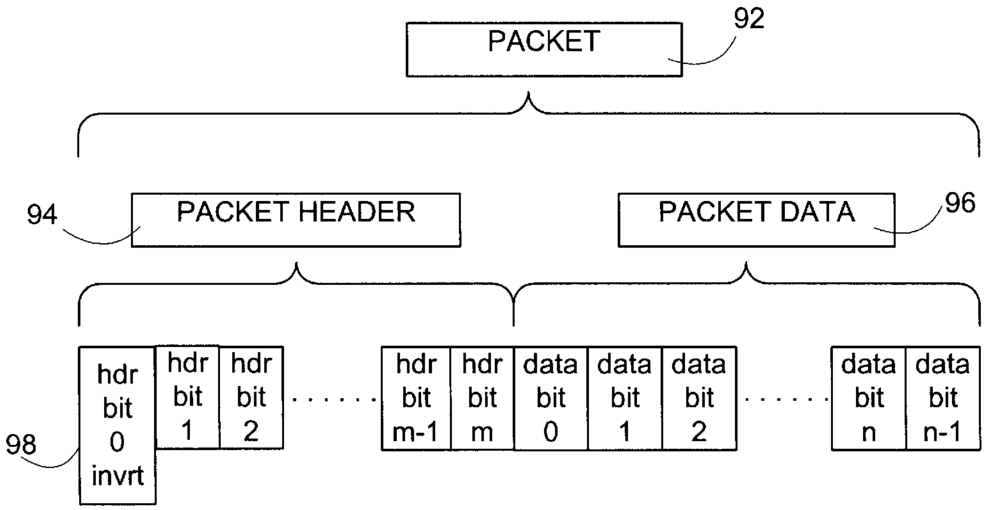
FIG. 5 is a block diagram illustrating an embodiment of a protocol which is part of an ink short protection system.

Therefore, a solution is implemented in the embodiment of FIG. 4 to compensate for the blocking capacitor's 86, 88 inability to pass a signal that does not have an equal number of logic zeros and logic ones. First, a protocol, as illustrated in FIG. 5, is defined. The protocol defines a packet 92 which includes a packet header 94 and packet data 96. The number of bits, n, in the packet data 96 may vary depending on the printhead design. The packet header 94 preferably has a bit referred to as the invert data bit 98. The packet header 94 may also optionally include other information such as, for example, encoding parameters. In order to avoid excessive build-up of charge on the blocking capacitors 86, 88, the packet data 96 is transmitted either inverted or non-inverted based on the previous sum of zeros and ones in the data stream. In the event that more ones have been transmitted, the next packet is preferably transmitted in such a way that the sum of ones is closer to the sum of zeros. The LVDS receiver 76 reads the invert data bit 98 and interprets the packet data 96 appropriately. The protocol may be implemented by an application specific integrated circuit (ASIC), a microprocessor, discreet digital logic components, or any combination thereof. Alternate components which include the functionality of an ASIC or a microprocessor may also be used those skilled in the art to implement the protocol.

Alternate protocols will be readily apparent to those skilled in the art and may be used, in place of the one using an invert data bit 98, to effectively keep the total of transmitted ones equal to the total of transmitted zeros. For example, a protocol may be defined which does not track the total number of transmitted zeros or transmitted ones, but which first transmits a given data packet without manipulation and then retransmits the entire packet inverted to cancel any charge which may have been accumulated as a result of the data packet. In this example of an alternate protocol, the printheads 44, 46 would activate the ink drop generators 64 in response to the data packet and ignore the inverted packets. In another example, a protocol may be defined which first transmits a given data packet without manipulation while counting the number of zeros and ones in the data packet. If the number of ones in the data packet is greater than the number of zeros, an offsetting number of zeros will be transmitted in addition to the data packet. If the number of zeros in the data packet is greater than the number of ones, an offsetting number of ones will be transmitted in addition to the data packet. In this example of an alternate protocol, the printheads 44, 46 would activate the ink drop generators 64 in response to the data packet and ignore the additional charge canceling ones or zeros. Other examples of alternate protocols will be apparent to those of ordinary skill in the art.

The second part of the embodiment illustrated in FIG. 4. to compensate for the blocking capacitors' 86, 88 inability to pass a signal that does not have an equal number of logic zeros and logic ones involves choosing capacitance values which pass an AC signal of a relatively low frequency, where low frequency is defined by the length of the packet 92. Appropriate capacitance values may be selected with the following formula:

$$I = C\frac{dV}{dt}$$

Based on the operating range of the LVDS driver 74 and receiver 76, a maximum one volt swing (dV) above or below the average DC set point is typically desired. The LVDS driver 74 nominally produces a constant current of three milliamps (I). The length of packet 92 may vary depending on the design of printheads 44, 46 and the printer 20 in question, but the time needed to transmit one packet length preferably determines the dt value. For example, a packet size of one-thousand bits transmitted at a rate of sixty megabits per second (Mbits/sec) results in a time interval (dt) of approximately 16.7 microseconds:

$$dt = \frac{1000 \text{ bits}}{60 \text{ Mbits/sec}} = 16.7 \ \mu\text{sec}$$

Assuming, in this example, a current (I) of three milliamps, and a maximum one volt swing (dV), the total desired capacitance calculates out to approximately fifty nanofarads:

$$C = \frac{I \cdot dt}{dV}$$

$$C = \frac{(3 \text{ mA})(16.7 \ \mu\text{sec})}{1 \text{ Volt}} = 50.1 \text{ nF}$$

The current from driver 74 will pass through both capacitors 86, 88 in series, and therefore, the total desired capacitance, in this example, will be expressed according to the following formula:

$$\frac{1}{C} = \frac{1}{C_{86}} + \frac{1}{C_{88}}$$

Here, $C_{86}$ and $C_{88}$ represent the capacitance of capacitors 86 and 88 respectively. In our example, since this is a differential system, it is desired to have $C_{86}$ equal $C_{88}$. Therefore, the total desired capacitance formula may be arranged as follows and an individual capacitance of approximately 0.1 microfarads is calculated for each of the capacitors 86 and 88 in this example:

$$C_{86} = C_{88} = 2(50 \text{ nF}) = 0.1 \ \mu\text{F}$$

Other capacitance values may be selected as appropriate by those skilled in the art based on the various parameters of a given LVDS system.

Thus, even in the worse case scenario where all ones or all zeros need to be communicated from the controller 26 to the printheads 44, 46, the protocol forces alternating packets of zeros and ones to transmit from the LVDS driver 74 to the LVDS receiver 76. The alternating packets are thereafter restored by comparing each data bit of the packet 92 with the invert data bit 98. Because the capacitance values for blocking capacitors 86, 88 are chosen to have a time constant based on the length of packet 92, the capacitors 86, 88 do not build up a charge, during a worse case transmission of all zeros or all ones, which would move the transmission voltage outside the preferred operating range of the LVDS driver 74 and the LVDS receiver 76.

Further aspects of the embodiment illustrated in FIG. 4 are non-inverted bleeder resistor 100 and inverted bleeder resistor 102. Non-inverted "bleeder" resistor 100 is connected in parallel across the non-inverted DC blocking capacitor 86, and inverted bleeder resistor 102 is connected in parallel across the inverted DC blocking capacitor 88. The bleeder resistors 100, 102 are intended to compensate for contributors to signal skew and asymmetrical duty cycle, such as mismatched drivers and unequal electrical path length. The bleeder resistor 100, 102 impedance is chosen to be high with respect to the impedance of the termination resistor 90 so that the differential signal is not disturbed and so that an ink short to a DC voltage will not create current which can harm the LVDS driver 74. For example, in one instance, assume a DC firing voltage of thirty volts is being supplied to the printheads 44, 46. Also assume it is desired to not let the current exceed three milliamps into the LVDS driver 74. In this example, bleeder resistors 100, 102 should have a resistance of ten kilo-ohms each to maintain a maximum current of three milliamps to the LVDS driver 74 in the event of a thirty volt short to either the non-inverted signal line 89 or inverted signal line 91. In this example, the ten kilo-ohm resistor would dissipate 0.09 watts during the thirty volt short, which would allow the bleeder resistors 100, 102 to be relatively small power resistors. Additionally, taking signal skew into account in this example, if skew is one percent during normal operation, current through either bleeder resistor 100, 102 will be 0.03 milliamps (one percent of a nominal three milliamp operating current). The 0.03 milliamp current through a ten kilo-ohm resistor results in a 0.3 volt drop across each bleeder resistor during normal operation, in this example, to accommodate signal skew. Other bleeder resistor 100, 102 values may be selected as appropriate by those skilled in the art based on the various parameters of a given LVDS system. The bleeder resistors 100, 102 also function to kick-start the charge flowing across the DC blocking capacitors 86, 88.

Figure 6:
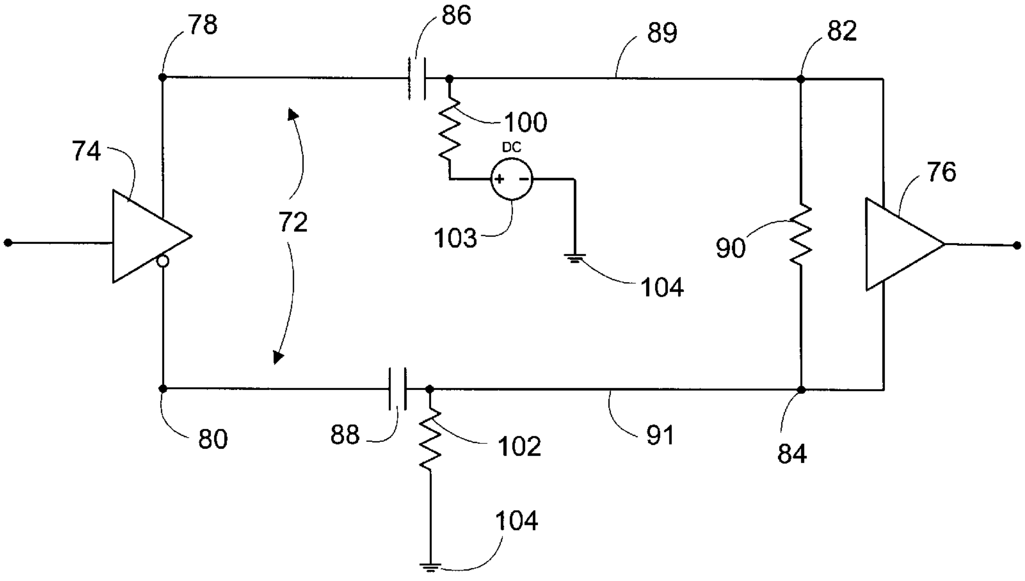
FIG. 6 is a functional schematic illustrating one embodiment of a passive circuit which is part of one example of an ink short protection system.

In another embodiment, shown in FIG. 6, the non-inverted bleeder resistor 100 is connected from non-inverted receiver terminal 82 to a DC voltage supply 103. Additionally, in the embodiment of FIG. 6, the inverted bleeder resistor 102 is connected from the inverted receiver terminal 84 to local ground 104. The bleeder resistors 100, 102 in the embodiment of FIG. 6 are still preferably chosen to have an impedance which is high with respect to the impedance of termination resistor 90, but the impedance of bleeder resistors 100, 102 should also have an impedance low enough to act as a low pass filter to ground 104, with a time constant of many packet 92 lengths.

Figure 7:
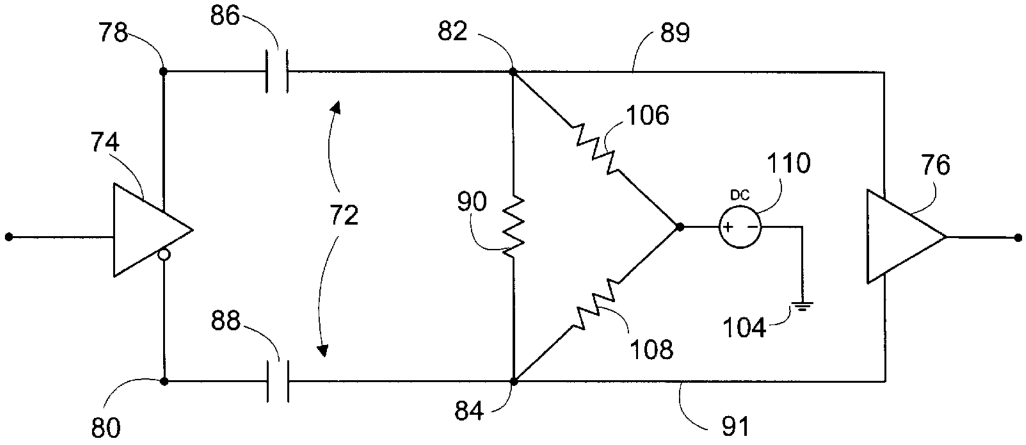
FIG. 7 is a functional schematic illustrating one embodiment of a passive circuit which is part of one example of an ink short protection system.

In another embodiment, shown in FIG. 7, the bleeder resistors 100, 102 are removed and pull-up resistors 106 and 108 are used instead. Pull-up resistor 106 is connected from the non-inverted LVDS receiver terminal 82 to DC voltage source 110. Pull-up resistor 108 is connected from the inverted LVDS receiver terminal 84 to DC source 110. The impedance of the pull-up resistors 106, 108 should be high with respect to termination resistor 90 so that the differential signal between LVDS receiver terminals 82 and 84 is not disturbed. The same guidelines described above to select the resistance values for bleeder resistors 100, 102 may be used to select pull-up resistors 106, 108. The pull-up resistors 106, 108 tend to compensate for signal skew and asymmetrical duty cycle.

Figure 8:
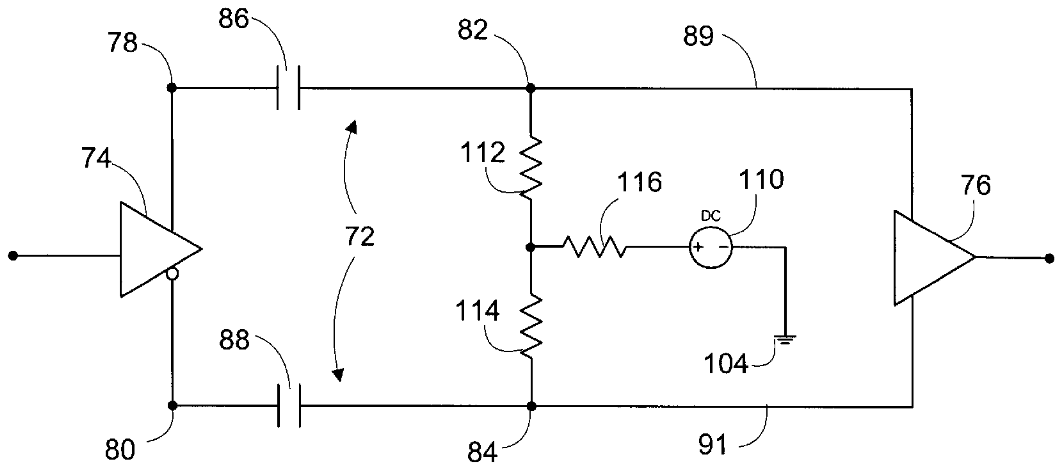
FIG. 8 is a functional schematic illustrating one embodiment of a passive circuit which is part of one example of an ink short protection system.

In another embodiment, shown in FIG. 8, neither bleeder resistors 100, 102, nor pull-up resistors 106, 108 are used. Termination resistor 90 is replaced by two termination resistors 112 and 114, each of which has a resistance one half the resistance of termination resistor 90. Termination resistors 112 and 114 are connected in series between non-inverted LVDS receiver terminal 82 and inverted LVDS receiver terminal 84 such that the differential signal between the LVDS receiver terminals 82, 84 is still terminated by effectively the same resistance as when termination resistor 90 was present. A center-tap pull-up resistor 116 is connected from between termination resistors 112 and 114 to DC voltage source 110. The impedance of center-tap pull-up resistor 116 should be high with respect to the combined impedance of termination resistors 112 and 114. The same guidelines described above to select the resistance values for bleeder resistors 100, 102 may be used to select center-tap pull-up resistor 116. Center-tap pull-up resistor 116 tends to compensate for signal skew and asymmetrical duty cycle.

Each of the embodiments illustrated in FIGS. 6–8 also needs to compensate for the DC blocking capacitors' 86, 88 inability to pass a signal that does not have an equal number of logic zeros and logic ones. For this reason, each of the embodiments illustrated in FIGS. 6–8 should utilize the protocol previously described as part of the embodiment of FIG. 4, or any other protocol which will keep the total ones and zeros transmitted from LVDS driver 74 to LVDS receiver 76 nearly equal.

An ink short protection system, like each of the systems illustrated in FIGS. 4, 6, 7, and 8, including a logic protocol to keep the number of zeros and the number of ones transmit on the system approximately equal, provides the ability to protect printer electronics from DC power supply ink shorts while still allowing the printer to take advantage of the high communication speeds possible with constant current differential signaling in an economical fashion. In discussing various components and embodiments of the ink short protection system, various benefits have been noted above.

It is apparent that a variety of other, equivalent modifications and substitutions may be made to the ink short protection system electronics and protocol to construct an ink short protection system according to the concepts covered herein, depending upon the particular implementation, while still falling within the scope of the claims below.

We claim:

1. An ink short protection system for signaling to inkjet printheads comprising:

a differential signaling driver having first and second terminals;

a differential signaling receiver having first and second terminals;

a first capacitor in series between the first terminals;

a second capacitor in series between the second tenninals;

first and second bleeder resistors connected in parallel across the first and second capacitors, respectively; and active circuitry for manipulating a data stream transmitted from the driver by steering current to the driver first terminal for a logic 1 data element and alternatively steering current to the driver second terminal for a logic 0 data element, whereby signals present on the first and second driver terminals tend to cancel the charge applied to the capacitors by previous signals.

2. An ink short protection system according to claim 1, wherein the active circuitry for manipulating the data stream includes a configuration to:

segment the data stream into data packets;

track whether a majority of logic 1 data elements or a majority of logic 0 data elements have been transmitted by the driver;

examine each data packet prior to transmission by the driver to determine whether a majority of logic 1 data elements or a majority of logic 0 data elements are in the data packet;

invert the data elements of the data packet prior to transmission by the driver if necessary to keep the number of transmitted logic 1 data elements approximately equal to the number of logic 0 data elements; and combine a data header with the data packets, including an invert data element to indicate whether the data elements of the data packet being transmitted by the driver are inverted.

3. An ink short protection system according to claim 2, wherein the active circuitry for manipulating the data stream comprises an Application Specific Integrated Circuit (ASIC).

4. An ink short protection system according to claim 2, wherein the active circuitry for manipulating the data stream comprises a microprocessor.

5. An ink short protection system according to claim 2, wherein the active circuitry for manipulating the data stream comprises discrete digital logic elements.

6. An ink short protection system according to claim 2, wherein the active circuitry for manipulating the data stream comprises a microprocessor and an ASIC.

7. An ink short protection system according to claim 1, wherein the passive circuitry for dissipating charge accumulated on the capacitors comprises:

a first bleeder resistor connected from the first receiver terminal to a positive voltage; and a second bleeder resistor connected from the second receiver terminal to a local ground.

8. An ink short protection system according to claim 7, wherein the active circuitry for manipulating the data stream includes a configuration to:

segment the data stream into data packets;

track whether a majority of logic 1 data elements or a majority of logic 0 data elements have been transmitted by the driver;

examine each data packet prior to transmission by the driver to determine whether a majority of logic 1 data elements or a majority of logic 0 data elements are in the data packet;

invert the data elements of the data packet prior to transmission by the driver if necessary to keep the number of transmitted logic 1 data elements approximately equal to the number of logic 0 data elements; and combine a data header with the data packets, including an invert data element to indicate whether the data elements of the data packet being transmitted by the driver are inverted.

9. An ink short protection system according to claim 8, wherein the active circuitry for manipulating the data stream comprises an Application Specific Integrated Circuit (ASIC).

10. An ink short protection system according to claim 8, wherein the active circuitry for manipulating the data stream comprises a microprocessor.

11. An ink short protection system according to claim 8, wherein the active circuitry for manipulating the data stream comprises discrete digital logic elements.

12. An ink short protection system according to claim 8, wherein the active circuitry for manipulating the data stream comprises a microprocessor and an ASIC.

13. An ink short protection system according to claim 1, wherein the passive circuitry for dissipating charge accumulated on the capacitors comprises:

a first pull-up resistor connected to the first receiver terminal and configured to receive a DC pull-up voltage; and a second pull-up resistor connected to the second receiver terminal and configured to receive the DC pull-up voltage.

14. An ink short protection system according to claim 13, wherein the active circuitry for manipulating the data stream includes a configuration to:

segment the data stream into data packets;

track whether a majority of logic 1 data elements or a majority of logic 0 data elements have been transmitted by the driver;

examine each data packet prior to transmission by the driver to determine whether a majority of logic 1 data elements or a majority of logic 0 data elements are in the data packet;

invert the data elements of the data packet prior to transmission by the driver if necessary to keep the number of transmitted logic 1 data elements approximately equal to the number of logic 0 data elements; and combine a data header with the data packets, including an invert data element to indicate whether the data elements of the data packet being transmitted by the driver are inverted.

15. An ink short protection system according to claim 14, wherein the active circuitry for manipulating the data stream comprises an Application Specific Integrated Circuit (ASIC).

16. An ink short protection system according to claim 14, wherein the active circuitry for manipulating the data stream comprises a microprocessor.

17. An ink short protection system according to claim 14, wherein the active circuitry for manipulating the data stream comprises discrete digital logic elements.

18. An ink short protection system according to claim 14, wherein the active circuitry for manipulating the data stream comprises a microprocessor and an ASIC.

19. An ink short protection system according to claim 1, further comprising:

a first termination resistor; and a second termination resistor connected in series with the first termination resistor between the first receiver terminal and the second receiver terminal.

20. An ink short protection system according to claim 19, wherein the passive circuitry for dissipating charge accumulated on the capacitors comprises a pull-up resistor, connected between the first termination resistor and the second termination resistor, configured to receive a DC pull-up voltage.

21. An ink short protection system according to claim 20, wherein the active circuitry for manipulating the data stream includes a configuration to:

segment the data stream into data packets;

track whether a majority of logic 1 data elements or a majority of logic 0 data elements have been transmitted by the driver;

examine each data packet prior to transmission by the driver to determine whether a majority of logic 1 data elements or a majority of logic 0 data elements are in the data packet;

invert the data elements of the data packet prior to transmission by the driver if necessary to keep the number of transmitted logic 1 data elements approximately equal to the number of logic 0 data elements; and combine a data header with the data packets, including an invert data element to indicate whether the data elements of the data packet being transmitted by the driver are inverted.

22. An ink short protection system according to claim 21, wherein the active circuitry for manipulating the data stream comprises an Application Specific Integrated Circuit (ASIC).

23. An ink short protection system according to claim 21, wherein the active circuitry for manipulating the data stream comprises a microprocessor.

24. An ink short protection system according to claim 21, wherein the active circuitry for manipulating the data stream comprises discrete digital logic elements.

25. An ink short protection system according to claim 21, wherein the active circuitry for manipulating the data stream comprises a microprocessor and an ASIC.

26. An ink short protection system according to claim 1, wherein:

the differential signaling driver further comprises a low-voltage differential signaling (LVDS) driver; and the differential signaling receiver further comprises a low-voltage differential signaling (LVDS) receiver.

27. An ink short protection system for signaling to inkjet printheads comprising:

a differential signaling driver having a first and a second terminal;

a differential signaling receiver having a first and a second terminal;

a first capacitor in series between the first terminals;

a second capacitor in series between the second terminals;

parallel means for reducing charge accumulation on the capacitors; and active means for manipulating a data stream transmitted from the driver by steering current to the first driver terminal for a logic 1 data element and steering current to the second driver terminal for a logic 0 data element, whereby signals present on the first and second driver terminals tend to cancel the charge applied to the blocking capacitors by previous signals.

28. An ink short protection system according to claim 27, wherein:

the differential signaling driver further comprises a low-voltage differential signaling driver; and the differential signaling receiver further comprises a low-voltage differential signaling receiver.

29. A method of ink short protection for differential signaling to inkjet printheads comprising:

blocking a first DC current between a first terminal of a differential signaling driver and a first terminal of a differential signaling receiver;

blocking a second DC current between a second terminal of the driver and a second terminal of the receiver; and manipulating a data stream which is transmitted from the driver to the receiver whereby signals present on to first and second terminals of the driver tend to cancel the charge applied to the blocking capacitors by previous signals, wherein manipulating the data stream comprises:

segmenting the data stream into data packets;

determining whether a majority of logic 1 data elements or a majority of logic 0 data elements have been transmitted by the driver;

examining each data packet prior to transmission by the driver to determine whether a majority of logic 1 data elements or a majority of logic 0 data elements are in the data packet;

inverting the data elements of the data packet prior to transmission by the driver if necessary to keep the number of transmitted logic 1 data elements approximately equal to the number of logic 0 data elements; and combining a data header with the data packets, including an invert data element to indicate whether the data elements of the data packet being transmitted by the driver are inverted.

30. A method of ink short protection according to claim 29, wherein:

the differential signaling driver further comprises a low-voltage differential signaling (LVDS) driver; and the differential signaling receiver further comprises a low-voltage differential signaling (LVDS) receiver.

31. An ink short protection system for connections to inkjet printheads comprising:

an LVDS driver having a first and a second terminal;

an LVDS receiver having a first and a second terminal;

a first capacitor in series between the first terminals;

a second capacitor in series between the second terminals;

passive circuitry for dissipating charge accumulated on the capacitors including:

a first bleeder resistor connected in parallel across the first capacitor; and a second bleeder resistor connected in parallel across the second capacitor; and active circuitry for manipulating a data stream transmitted from the driver by steering current to the driver first terminal for a logic 1 data element and alternatively steering current to the driver second terminal for a logic 0 data element, whereby signals present on the first and second driver terminals tend to cancel the charge applied to the capacitors by previous signals, and wherein the active circuitry includes a configuration to:

segment the data stream into data packets;

track whether a majority of logic 1 data elements or a majority of logic 0 data elements have been transmitted by the driver;

examine each data packet prior to transmission by the driver to determine whether a majority of logic 1 data elements or a majority of logic 0 data elements are in the data packet;

invert the data elements of the data packet prior to transmission by the driver if necessary to keep the number of transmitted logic 1 data elements approximately equal to the number of logic 0 data elements; and combine a data header with the data packets, including an invert data element to indicate whether the data elements of the data packet being transmitted by the driver are inverted.

32. An ink printhead comprising:

a plurality of ink drop generators;

a differential signal receiver; and circuitry including a configuration to interpret binary packets received by the differential receiver, wherein:

the binary packets include an invert bit and data bits; and the circuitry reads the invert bit from each binary packet and inverts the data bits when indicated by the invert bit prior to using the data bits to trigger the ink drop generators.

33. An ink printhead according to claim 32, wherein the ink drop generators comprise heater resistors, ink chambers, and nozzles which thermally generate drops of ink.

34. An ink printhead according to claim 33, wherein the circuitry including a configuration to interpret binary packets received by the receiver comprises discrete digital logic elements.

35. An ink printhead according to claim 33, wherein the circuitry including a configuration to interpret binary packets received by the receiver comprises an Application Specific Integrated Circuit (ASIC).

36. An ink printhead according to claim 33, wherein the circuitry including a configuration to interpret binary packets received by the receiver comprises an Application Specific Integrated Circuit (ASIC) and discrete digital logic elements.

37. An ink printhead according to claim 32, wherein the differential signal receiver comprises a low-voltage differential signaling (LVDS) receiver.

38. An ink short protection system for signaling to inkjet printheads comprising:

a differential signaling driver having a first and a second terminal;

a differential signaling receiver having a first and a second terminal;

a first capacitor in series between the first terminals;

a second capacitor in series between the second terminals;

means for reducing charge accumulation on the capacitors; and means for:

determining whether a majority of logic 1 data elements or a majority of logic 0 data elements have been transmitted by the driver;

examining each data packet prior to transmission by the driver to determine whether a majority of logic 1 data elements or a majority of logic 0 data elements are in the data packet;

inverting the data elements of the data packet prior to transmission by the driver if necessary to keep the number of transmitted logic 1 data elements approximately equal to the number of logic 0 data elements; and combining a data header with the data packets, including an invert data element to indicate whether the data elements of the data packet being transmitted by the driver are inverted.

* * * * *

UNITED STATES PATENT AND TRADEMARK OFFICE

CERTIFICATE OF CORRECTION

PATENT NO. : 6,631,962 B2

DATED : October 14, 2003

INVENTOR(S) : Rehmann et al.

It is certified that error appears in the above-identified patent and that said Letters Patent is hereby corrected as shown below:

Column 13,
Line 4, delete the second "to" and insert therefore -- the --.

Signed and Sealed this

Thirteenth Day of July, 2004

JON W. DUDAS
*Acting Director of the United States Patent and Trademark Office*